Patented Apr. 30, 1946

2,399,214

UNITED STATES PATENT OFFICE 2,399,214

CONVERTIBLE ALKYD RESINS

Theodore W. Evans, Oakland, and David E. Adelson, Berkeley, Calif., assignors to Shell Development Company, San Francisco, Calif., a corporation of Delaware No Drawing. Application June 15, 1943,
Serial No. 490,933

8 Claims. (Cl. 260—78)

This invention relates to a class of alkyd resins which are both heat and oxygen convertible. More particularly, the invention pertains to alkyd resins from a class of unsaturated ethers of glycerol or glycidol and a dicarboxylic acid or an acid anhydride.

Alkyd resins are primarily complex esters from polyhydric alcohols and polybasic carboxylic acids and have been produced with widely varying properties. The variation in properties is largely dependent upon the particular type of reactants utilized in forming the resin. Dependent upon their nature and properties, the alkyd resins are classified broadly into three general groups.

The alkyds of group I are termed non-convertible and are derived from two reactants while being devoid of other modifiers, each of these reactants being bi-functional. A resin of this type is obtainable from a glycol which contains two functional hydroxy groups and a dicarboxylic acid containing two acid groups. The resins from these reactants have molecules which are linear in character and since no cross linkage is possible, no three dimensional molecules are obtainable to give a resin which is convertible by heat or oxygen to an insoluble and infusible state.

The alkyds of group II are termed heat-convertible and are obtainable from reactants at least one of which has a functionality greater than two. A classic example of an alkyd resin of this type is that from glycerol and phthalic acid or anhydride. By esterifying glycerol with phthalic acid or acid anhydride, a resin product is first obtained which is both fusible and soluble in a number of solvents. The resin in this state is known as the A form in being both fusible and soluble. By further heating the resin the B form is obtained which is a gel and is fusible, but insoluble. Additional heating converts the B form to the C form which is both infusible and insoluble. Resins of this type are known as heat-convertible alkyds for the reason that the fusible and soluble resin (A form) which is convenient for handling in applications thereof, upon being heated, is converted to the infusible and insoluble resin (C form).

The resins of group III are known as oxygen-convertible or air-drying alkyds since they are converted to the infusible and insoluble state by contact with oxygen such as air. Resins of this type may be prepared from glycerol and phthalic acid to which has been added a drying oil acid. The presence of the drying oil residue in the molecules enables oxygen to convert the resin to an infusible and insoluble state probably by oxygen linkage.

An object of the present invention is to provide a new class of alkyd resins.

Another object of the invention is to provide a class of alkyd resins which are both heat and oxygen convertible.

A further object of the invention is to provide a method of preparing such resins.

These and other objects of the invention will be apparent from the description given hereinafter.

We have discovered that alkyd resins which are convertible either by heat or oxygen or both, are obtainable by reacting an unsaturated ether of glycerol or glycidol with a dicarboxylic acid or acid anhydride. While the glycerol derivatives and the dicarboxylic acid from which the resins are derived, are each bi-functional compounds with respect to containing only two hydroxyl and two acid groups, nevertheless, the resins are convertible by having present an unsaturated ether group by means of which, either by carbon-to-carbon bonding, or bonding through an oxygen atom, or possibly both, three dimensional molecules are formed giving an infusible and insoluble form of the resin. The initial resinification treatment of the reactants involves an esterification reaction which requires somewhat elevated temperatures. By use of a particular class of unsaturated ethers, we have found that the desired fusible and soluble form of the alkyd can be obtained without coupling occurring through the unsaturated ether group during the esterification although the resin is subsequently convertible by the action of heat or oxygen. The class of unsaturated ethers of glycerol which are neither too unstable for preparation of the alkyd, nor too stable so as to prevent subsequent conversion, are preferably those having an olefinic bond in a particular position. These preferred compounds are mono-ethers of glycerol or glycidol having in the ether group, an olefinic bond between two carbon atoms one of which is directly linked to a saturated carbon atom having the ethereal oxygen atom linked directly thereto. Further, at least one of the unsaturated carbon atoms contains one or more hydrogen atoms linked directly thereto. More preferably, the reactants are glycerol alkenyl ethers or glycidol alkenyl ethers wherein the alkenyl group contains not more than 6 carbon atoms and has an olefinic linkage between two carbon atoms one of which is a terminal methylene group and to the other of which is linked directly a saturated carbon atom having the ethereal oxygen atom linked directly thereto. If desired, the unsaturated ether group can contain one or more halogen atoms as substituents. Representative preferred compounds employed in preparing the alkyd resins of the invention include such glycerol mono-ethers as allyl, methallyl, 2-chlorallyl, 3-chlorallyl, methyl vinyl carbinyl, ethallyl, ethyl vinyl carbinyl, methyl isopropenyl carbinyl, cyclohexallyl, etc., as well as less preferred types as cinnamyl, 2-pentenyl, 2-isohexenyl, 2-dodecenyl, crotyl, 2-chlorocrotyl, etc.

The corresponding glycidol unsaturated ethers can also be used as reactants, if desired, and are to be preferred in some respects, one of which is that one less molecule of water need be removed in the esterification involved in the formation of the resin. The unsaturated radical in the glycidyl ethers can be the same as those illustrated in the foregoing for the glycerol ethers.

Either glycerol allyl ether or glycidol allyl ether is the most preferred reactant owing to the easier and more rapid convertibility of the alkyd resin than those derived from the higher unsaturated ethers.

While the preferred glycerol and glycidol ether reactants have been described in the foregoing, the invention also contemplates the use of monoethers of glycerol and glycidol having an unsaturated hydrocarbon radical linked to the ethereal oxygen atom wherein the hydrocarbon radical contains an olefinic linkage between two carbon atoms one of which has at least one hydrogen atom linked directly thereto and one of which is linked to the ethereal oxygen atom by means of one or more intervening carbon atoms. The structure of the broad class of reactants is such as to include those unsaturated mono-ethers of glycerol or glycidol wherein the unsaturated carbon atom of the hydrocarbon radical nearest to the ethereal oxygen atom is separated therefrom by at least one intervening carbon atom. These reactants within the scope of the invention include glycerol and glycidol mono-ethers such as 3-butenyl, 4-pentenyl, 1,3-dimethyl-3-butenyl, 3-pentenyl, 5-hexenyl, oleyl, 3-phenyl-3-pentenyl, linoleyl, 3-pentenyl-4-cyclopentyl, 2-isopropyl-3-butenyl, etc., which are representative compounds.

Other more complex ethers may be utilized in forming the alkyd resins of the invention. These compounds include the unsaturated ethers of polyhydric alcohols which ethers contain at least two alcoholic hydroxy groups and preferably contain only two alcoholic hydroxy groups. Representative members of the compounds are allyl ether of erythritol, dimethallyl diether of erythritol, allyl ether of pentaerythritol, methyl vinyl carbinyl ether of pentaerythritol, diallyl diether of pentaerythritol, 2-chlorallyl ether of xylitol, triallyl triether of adonitol, dicinnamyl diether of pentaerythritol, oleyl ether of arabitol, quatra-allyl ether of mannitol, methallyl ether of sorbitol, 3-butenyl ether of erythritol, 2-cyclohexenyl ether of perseitol, penta-allyl ether of perseitol, allyl ether of beta-methyl glycerol, methallyl ether of alpha-methyl glycerol, cinnamyl ether of beta-phenyl glycerol, 3-pentenyl ether of alpha-methyl beta-ethyl glycerol as well as compounds of the formulae

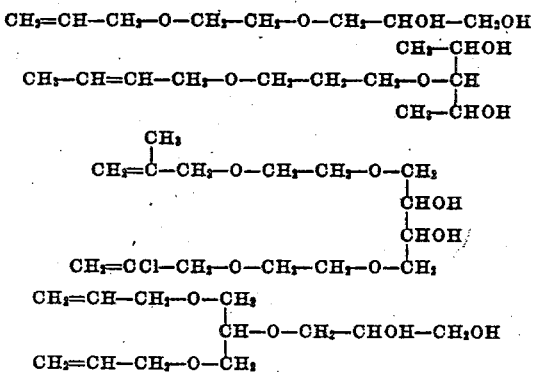

If desired, complex unsaturated ethers containing epoxide groups may be used rather than the polyhydroxy unsaturated ethers. Such starting materials include such representative compounds as allyl ether of beta-methyl glycidol, methallyl ether of beta-methyl glycidol, chlorallyl ether of alpha-ethyl glycidol, methyl vinyl carbinyl ether of beta-phenyl glycidol, oleyl ether of beta-methyl glycidol, crotyl alpha-phenyl glycidyl ether, allyl ether of 3,4-epoxybutanol-1, allyl ether of 2,3-4,5-diepoxy pentanol-1, methallyl ether of 1,2-5,6-diepoxyhexanol-3, etc. Preferably the compounds contain only a single epoxy or epoxide group. The starting materials for this class are conveniently represented as a compound of the formula $$R\text{—}O\text{—}R_1$$

wherein R designates an unsaturated radical containing an olefinic double bond linking two carbon atoms, one of which contains at least one hydrogen atom linked thereto, and with the carbon atom linked directly to the ethereal oxygen atom of said compound being saturated while $R_1$ designates a substituted hydrocarbon radical of the group consisting of an oxygen-containing hydrocarbon radical containing at least two hydroxy groups and an oxygen-containing hydrocarbon radical containing an epoxy group.

In forming the resin of the invention, the glycerol unsaturated ether or the corresponding glycidol unsaturated ether is reacted with a dicarboxylic acid or the corresponding acid anhydride. Any dicarboxylic acid or acid anhydride is suitable although the properties of the resin will vary somewhat depending upon the particular compound used. As examples of typical compounds are oxalic acid, malonic acid, succinic acid, glutaric acid, adipic acid, sebacic acid, maleic acid, isosuccinic acid, fumaric acid, phthalic acid, tetrahydrophthalic acid, terephthalic acid, napthlenedicarboxylic acid, diglycollic acid, dithioglycollic acid, dilactic acid, as well as the corresponding acid anhydrides. The acid anhydrides are preferred reactants though in some instances they are non-existent substances such as in the case with fumaric acid and the free acid must necessarily be used.

The alkyd resins of the present invention which are obtained from an unsaturated ether of glycerol or glycidol are distinct in structure and different in properties from the resin disclosed by Kienle in U. S. Patent No. 1,921,756 who shows a resin prepared by heating a polybasic acid with a saturated alcohol or allyl alcohol and then adding glycerol to the reaction mixture for completion of the resinification process, the monohydric alcohol being used in place of part of the glycerol of the glycerol-polybasic acid alkyd resin. The resins of the patentee are heat-convertible owing to the use of glycerol which is a tri-functional reactant while the improved alkyd resins of the present invention are both heat and oxygen convertible owing to the unsaturated group being linked by an ethereal oxygen atom to the resin molecule. Further the alkyd resins known to the art which are prepared from glycerol alkyl ethers are not convertible while those of the present invention are rendered infusible and insoluble by heating or contacting with oxygen because of the presence of the unsaturated groups ethereally linked to the resin molecule.

In effecting the resinification process a mixture of the ether reactant and acid reactant is heated in an inert atmosphere. By an inert atmosphere is meant one substantially devoid of oxygen such as an atmosphere of nitrogen, carbon dioxide, helium, methane, or the like. The reaction mixture is heated to effect the desired reactions at a temperature of about 150 to 250° C. If desired the cooking may be started with a low temperature and gradually increased. It is ordinarily preferable to effect the resinification with a temperature maintained below about 200° C. since too high temperatures are prone to cause discoloration of the resin.

The preparation of reactants can be varied to considerable extent depending upon the properties desired in the finished product. Ordinarily equimolecular amounts of ether reactant and acid reactant are suitable although excellent results are obtained with 10 to 20% excess of the ether reactant and, when an excess of one reactant over the other is used, it is usually desirable to employ an excess of the ether reactant.

Since the alkyd resin is heat-convertible, care is required during the resinification operation to avoid converting the resin to a step beyond that of being fusible and soluble. This will occur if the reaction mixture is over-cooked. To avoid such difficulty, the course of the resinification is conveniently followed by making determinations of the acid number upon samples withdrawn from the reaction mass or by other well known methods. Ordinarily the heating is continued until the acid number has been reduced to a value of about 10 to 40. Another expedient useful for preventing gel formation, is the use of small amounts up to 25% of a diluent such as a hydrocarbon like kerosene.

For the purpose of further illustrating the method of preparing the convertible alkyd resin and some of its properties, the following examples are given wherein the use of the most preferred reactants are described, but it is to be understood that the invention is not to be construed as limited to any specific details given therein.

Example I

About 26.4 parts of glycerol allyl ether and 29.6 parts of phthalic anhydride were placed in a vessel fitted in an oil bath maintained at about 180° C. Nitrogen was bubbled through the reaction mass during the heating for the purpose of agitating it and carrying off volatile products as well as to maintain an inert atmosphere over it. After 18 hours heating at 180° C., the product was still liquid with little more body than at the start, but had turned amber in color. After about 26 hours, the reaction mass had considerable mass and a drop of the resin would solidify on cooling to room temperature. A determination gave a value of 31 for the acid number after 31 hours heating. The heating was discontinued after 51 hours and it was found that the acid number had been reduced to about 10.5. The product was a very viscous, dark brown mass.

Example II

A portion of the alkyd resin prepared as described in Example I which amounted to 5 grams was dissolved in 50 cc. of acetone and the solution was divided into two parts. Nothing was added to one part of the solution while two drops of siccative solution was added to the other portion. The siccative solution contained a mixture of lead, manganese and cobalt naphthenates in oil and in amounts so that the metal content thereof was 0.072% Pb, 0.018% Mn and 0.018% Co. Films of the convertible alkyd were prepared and subjected to the conditions and with the results shown in the following table:

| Film No. | Siccative | Temperature | Appearance after 3 days |
|---|---|---|---|
| 1 | No | Room | Slightly tacky. |
| 2 | No | 120° C | Hard. |
| 3 | Yes | Room | Non-tacky, but softer than No. 2. |
| 4 | Yes | 120° C | Very hard. |

The alkyd resin film was oxygen-convertible by contact with air and when baked at an elevated temperature in the presence of a drier and air, was converted to a hard material.

Example III

For the purpose of further determining the drying qualities of the alkyd resin described in Example I, films of the resin were prepared with and without drier. Two drops of the siccative solution described in Example II were mixed with about 4.9 grams of the resin. The conditions of hardening together with the results obtained are tabulated below.

| Film No. | Siccative | Temperature | Time in hours | Appearance of film |
|---|---|---|---|---|
| 1 | No | Room | 0 | Very soft. |
|  |  |  | 3 | Tacky. |
|  |  |  | 23.5 | Do. |
|  |  |  | 27.5 | Do. |
|  |  |  | 44 | Do. |
| 2 | No | 120° C | 0 | Very soft. |
|  |  |  | 3 | Soft. |
|  |  |  | 7 | Medium hard. |
|  |  |  | 11 | Hard. |
|  |  |  | 27.5 | Do. |
| 3 | Yes | Room | 0 | Very soft. |
|  |  |  | 3 | Soft, tackfree. |
|  |  |  | 23.5 | Do. |
|  |  |  | 27.5 | Do. |
|  |  |  | 44 | Do. |
| 4 | Yes | 120° C | 0 | Very soft. |
|  |  |  | 3 | Medium hard. |
|  |  |  | 7 | Do. |
|  |  |  | 11 | Hard. |
|  |  |  | 27.5 | Do. |

Oxygen of the air combines with the resin when it hardens. This is seen from the results of carbon and hydrogen analyses determined upon Film Nos. 3 and 4 and given in the following table:

| Film No. | Carbon | Hydrogen | Oxygen (by diff.) | Increase in oxygen | Percentage increase in oxygen |
|---|---|---|---|---|---|
| Original resin | 63.5 | 5.5 | 31.0 | | |
| 3 | 61.5 | 5.4 | 33.1 | 2.1 | 6.7 |
| 4 | 62.1 | 5.5 | 32.4 | 1.4 | 4.5 |

Example IV

About 29 parts of glycerol allyl ether and 29.6 parts of phthalic anhydride were added to a vessel immersed in an oil bath maintained at about 180° C. Nitrogen was passed through the reaction mixture and samples thereof were withdrawn at intervals for determination of the acid number. The results of these analyses are tabulated below:

| Time from start | Acid number |
|---|---|
| 10 hours | 110.6 |
| 43 | 24.5 |
| 45 | 25 |
| 87.7 | 10.1 |

The alkyd resin obtained after 87.7 hours of heating was a dark brown, gummy solid.

Example V

About 22.9 parts of glycidol allyl ether and 29.6 parts of phthalic anhydride were placed in a vessel equipped with a reflux condenser and agitator, and the vessel was immersed in an oil bath at 100° C. Over a period of about 2 hours, the temperature was gradually increased to 180° C., which temperature was maintained over the course of formation of the resin. Nitrogen was by-passed through the condenser to keep oxygen away from the reaction mixture. After 6.25 hours, the acid number of the mixture was 91.8 and was decreased to 42.5 after only 17 hours at which point the heating was discontinued. It is seen the alkyd resin was formed in much less time when glycidol allyl ether rather than glycerol allyl ether was employed as reactant. Further, a more satisfactory color for the resin was obtained, it being an amber colored, very viscous mass.

Example VI

A mixture of 25.4 parts of glycidol allyl ether and 29.6 parts of phthalic anhydride was heated at 180° C. in a vessel fitted with a condenser through which nitrogen was passed. The acid number of the product was 109 after 5 hours heating and reached 43.1 in 12¾ hours. After heating about 22½ hours the reaction mass was an insoluble gel indicating that the heating had been continued for too long a period so that heat conversion of the alkyd resin to the gel form had occurred.

Example VII

About 57 parts of glycidol allyl ether and 74 parts of phthalic anhydride were placed in a vessel fitted with a reflux condenser through which nitrogen was passed. To retard gelling, about 26 parts of odorless kerosene boiling at 400 to 485° F. was added. The mixture was swept out with nitrogen and the temperature rose from 183 to 220° C. After 6 hours heating, the acid number was 71 and 26 parts of additional glycidol allyl ether was added. The acid number was reduced to 46.2 after 13 hours when the heating was stopped. The alkyd resin obtained was a heat- and oxygen-convertible, dark brown, gummy mass.

The convertible alkyd resins of the invention are rendered insoluble and infusible (converted to the C form) by subjection to the action of heat or oxygen or both. When connected with oxygen, such as in application of the resin for surface coatings wherein they are spread on a surface in the form of a film, siccatives are useful to accelerate the drying. For this purpose substances like lead, cobalt or manganese linoleates, resinates, naphthenates, etc., are incorporated in small amounts with the resin. The resins are also hardenable by the action of heat as by a baking treatment and for this purpose films of the resins when subjected to temperatures of about 80 to 150° C. are converted to the final state of resinification. The alkyd resins are excellent for use with infrared baking methods where films are subjected to the heating action of infrared radiation.

The resins are useful in the variety of applications when applied in surface coating compositions like enamels, paints and the like. They are particularly suitable owing to their high adhesiveness and protective resistance. When used in this manner, the resins are employed in a vehicle and formulated with various ingredients such as other resins, plasticizers, pigments, etc. The resin is also useful for impregnating material such as wood, cloth, paper, etc. Although the resin is not what is termed a rapid thermosetting material, it may be used to form articles by molding under the action of heat and pressure. In converting the resin by the action of heat, peroxide catalysts such as benzoyl peroxide, acetyl peroxide, ascaridole, etc., are usefully incorporated with it.

The resins of the present invention which are polyesters, involve formation first of simple mono-esters of the unsaturated mono-ether of glycerol. Thus the reaction of a dicarboxylic acid or the anhydride with glycerol monoallyl ether ocurs with the formation of the glycerol monoallyl ether mono-ester of the dicarboxylic acid. This mono-ester reacts with the acid or acid anhydride to produce the di-ester. As an example to consider a particular case, the simple ester products which are obtained when glycerol monoallyl ether with phthalic anhydride may be illustrated. The first product will be the compound represented by the formula

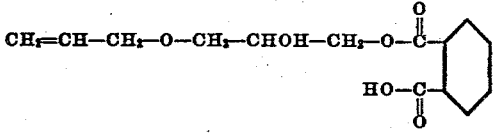

This mono-ester reacts with additional phthalic anhydride to give the di-ester of the formula

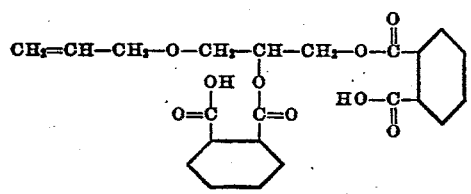

The exclusion principle of Carothers precludes formation of internal esters obtained by cyclization except in the cases where a 5 or 6 membered ring is possible such as in the case where oxalic acid is employed, for example. In other words, the free acid group and free hydroxyl group of the mono-ester of glycerol allyl ether and phthalic anhydride will not react to give an internal di-ester, but by reacting oxalic acid with glycerol or glycidol mono-allyl ether the product of the following formula can be produced.

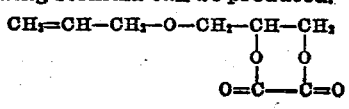

These simple esters of the invention are intermediate products of the alkyd resins that are obtainable by discontinuing heating of the reaction mixture after formation of the simple esters form and separating them from higher products which may be unavoidably produced and unreacted ether and acid. The simple esters are in themselves highly useful products in that besides being by action of heat reacted to the resin form by further esterification coupling, they are capable of polymerization or conversion through the unsaturated ether group to resinous substances by treatment with heat, oxygen or other polymerization catalysts.

We claim as our invention:

1. A process for the preparation of a convertible alkyd resin which comprises heating and reacting in an inert atmosphere glycidol allyl ether with a compound from the class consisting of dicarboxylic acids and dicarboxylic acid anhydrides.

2. An alkyd resin obtained by heating and reacting in an inert atmosphere glycidol allyl ether with phthalic anhydride, said resin being heat- and oxygen convertible to an infusible and insoluble state.

3. A process for the preparation of an alkyd resin which comprises heating and reacting in an inert atmosphere a compound from the group consisting of dicarboxylic acids and dicarboxylic acid anhydrides with a glycidol alkenyl ether wherein the alkenyl radical contains 3 to 6 carbon atoms and has the olefinic linkage between two carbon atoms, one of which is the carbon atom of a terminal methylene group and the other of which is linked directly to the saturated carbon atom having the ethereal oxygen atom of said ether linked directly thereto.

4. A process for the preparation of an alkyd resin which comprises heating and reacting in an inert atmosphere at 150 to 250° C. a compound from the group consisting of dicarboxylic acids and dicarboxylic acid anhydrides with a glycidol alkenyl ether wherein the alkenyl radical contains 3 to 6 carbon atoms and has the olefinic linkage between two carbon atoms, one of which is the carbon atom of a terminal methylene group and the other of which is linked directly to the saturated carbon atom having the ethereal oxygen atom of said ether linkage directly thereto.

5. A convertible alkyd resin obtained by heating and reacting in an inert atmosphere a dicarboxylic acid anhydride with a glycidol alkenyl ether wherein the alkenyl radical contains 3 to 6 carbon atoms and has the olefinic linkage between two carbon atoms, one of which is the carbon atom of a terminal methylene group and the other of which is linked directly to the saturated carbon atom having the ethereal oxygen atom of said ether linked directly thereto.

6. An alkyd resin obtained by heating and reacting in an inert atmosphere a compound from the group consisting of dicarboxylic acids and dicarboxylic acid anhydrides with a glycidol alkenyl ether whein the alkenyl radical contains 3 to 6 carbon atoms and has the olefinic linkage between two carbon atoms, one of which is the carbon atom of a terminal methylene group and the other of which is linked directly to the saturated carbon atom having the ethereal oxygen atom of said ether linked directly thereto.

7. A process for the preparation of a convertible alkyd resin which comprises heating and reacting in an inert atmosphere a dicarboxylic acid anhydride with a glycidol alkenyl ether wherein the alkenyl radical contains 3 to 6 carbon atoms and has the olefinic linkage between two carbon atoms, one of which is the carbon atom of a terminal methylene group and the other of which is linked directly to the saturated carbon atom having the ethereal oxygen atom of said ether linked directly thereto.

8. A process for the preparation of a convertible alkyd resin which comprises heating and reacting in an inert atmosphere phthalic anhydride with glycidol allyl ether.

THEODORE W. EVANS.
DAVID E. ADELSON.